Figure 1:
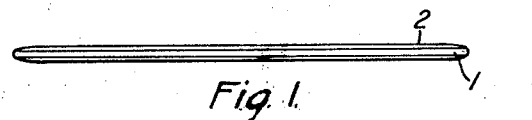

Sept. 11, 1923.  1,467,776
P. E. DEMMLER
CONDENSER AND METHOD OF MAKING THE SAME
Filed Jan. 16, 1919

WITNESSES:
H. J. Shelhamer
O. E. Bee.

INVENTOR
Paul E. Demmler
BY
Wesley G. Carr
ATTORNEY

Patented Sept. 11, 1923.

1,467,776

UNITED STATES PATENT OFFICE.

PAUL E. DEMMLER, OF PITTSBURGH, PENNSYLVANIA, ASSIGNOR TO WESTINGHOUSE ELECTRIC & MANUFACTURING COMPANY, A CORPORATION OF PENNSYLVANIA.

CONDENSER AND METHOD OF MAKING THE SAME.

Application filed January 16, 1919. Serial No. 271,545.

*To all whom it may concern:*

Be it known that I, PAUL E. DEMMLER, a citizen of the United States, and a resident of Pittsburgh, in the county of Allegheny and State of Pennsylvania, have invented a new and useful Improvement in Condensers and Methods of Making the Same, of which the following is a specification.

My invention relates to condensers and to methods of making the same and it has, for its primary object, the construction of condensers by a method which will insure a product of compact structure and high efficiency.

It is well known that the efficiency of a condenser is increased as the distance between the layers of conducting material embodied in the condenser is decreased. It is very desirable, therefore, that a dielectric be employed which will insure disposition of the layers of conducting material of the condenser in as close relation as possible. In view of this, one object of my invention is to provide condensers having a dielectric material which will insure compact disposition of the conducting material and, consequently, a highly efficient product.

Another object of my invention is to construct condensers by a method which will promote rapid production of such articles and thus decrease the cost of them.

A still further object of my invention is to construct condensers of readily available material which is comparatively inexpensive.

With these and other objects in view, my invention will be more fully described, illustrated in the drawings, in the several views of which corresponding numerals indicate like parts, and then particularly pointed out in the claims.

Figure 2:
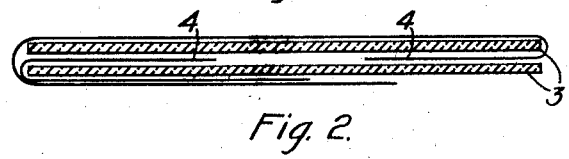
Figure 3:
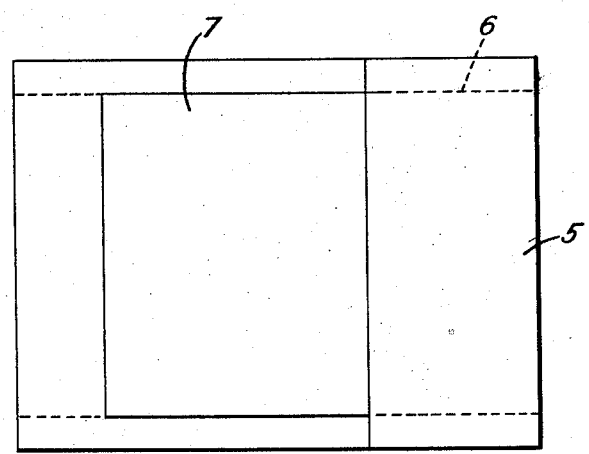
Figure 4:
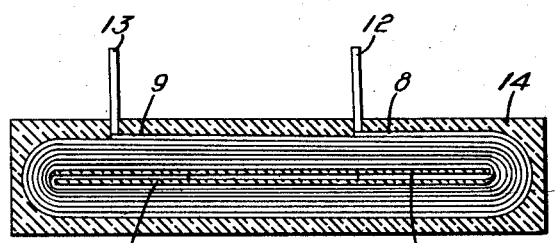

In the drawings, Fig. 1 is an end elevation of an insulated metal foil which may be employed in constructing a condenser in accordance with my invention; Fig. 2 is a diagrammatic view, illustrating a method of forming condensers in accordance with my invention; Fig. 3 is a plan view of a partially-formed condenser embodying my invention, and Fig. 4 is an end view, partly in elevation and partly in section, of a finished condenser constructed by a method hereinafter set forth.

I may construct a condenser, in accordance with my invention, by employing metal foil of suitable width and length and subjecting the metal foil to a bath of insulating adhesive adapted to harden under the application of heat. I employ a plurality of strips of metal foil, insulated as above mentioned, and wind these strips together so that they engage each other throughout the major portion of their lengths to provide a condenser. The insulating material, hardened on the strips of metal foil, is utilized as the dielectric and the foil as the conducting material, as in ordinary condensers. The ends of the metal foil are disposed in spaced relation to provide adequate insulation between the inner ends and to allow fastening of terminals to the outer ends.

In Fig. 1 is shown a metal foil or ribbon 1, coated with an insulating or dielectric material 2, which may be employed in constructing a condenser. The foil 1 may be of any suitable material but I have found, by experiment, that aluminum foil is especially adapted for use with the insulating material I employ. The insulating material may be, preferably, a baking varnish, such as is employed in insulating electric conductors. The aluminum foil, when subjected to a bath of baking varnish and then drawn through a drying tower, heated to substantially 280° C., is closely united with the varnish. I have found, however, in some instances, that it is desirable to first pickle the aluminum foil in a hot hydrochloric acid bath which may comprise one part hydrochloric acid to substantially three parts of water. The aluminum foil may then be washed in water and dried. The foil may also be washed in naphtha or benzol, without any pickling. Such treatment ensures unusually good adhesion between the baking varnish and the foil.

Various materials may be employed in making a foil for use in constructing condensers in accordance with my invention. For example, a foil comprising substantially 85% lead and 15% tin may be employed to get satisfactory results. However, some materials ensure better adhesion between the baking varnish and the foil and I have found that an aluminum foil gives slightly better results, in this respect, than a foil comprising lead and tin, in the above mentioned proportions.

I may employ a plurality of strips of aluminum foil coated with baking varnish and wind these strips to form a condenser.

The method of winding the strips is best illustrated in Fig. 2. As here shown, a plurality of plates 3 of insulating material, such as micarta, may be employed. The micarta comprises merely a layer or two of paper or muslin impregnated with a hardened phenolic condensation product. However, any kind of suitable insulating plate may be employed. Strips 4 of foil may be wound about such plates 3 by first disposing one end of each strip 4 between the plates, the ends being in spaced relation so that they will be insulated from each other. This is done for the reason that the varnish adheres less strongly to the edges of the foil when it is subjected to the coating process and, therefore, it is more likely to break down at these edges. After the ends of the foils are disposed between the plates, the plates may be forced together, as near as possible and the windings of the foil disposed about them as indicated in Fig. 2.

On account of the fact that the baking varnish or other insulating material adheres less strongly to the edges of the foil, it is advantageous to employ strips of foil of different widths. I have illustrated in Fig. 3, a condenser 5 formed of a plurality of foils of different widths. The broken line 6 indicates the edge of the narrow strip of foil 7. Furthermore, by employing a plurality of foils of different widths, one of the foils may be utilized without being coated. In this case, the wider coil is coated.

As shown in Fig. 4, the foils 8 and 9 are wound upon insulating plates 10 and 11 so as to engage each other throughout the major portion of their lengths, the inner and outer ends being disposed in spaced relation. The inner ends, as above mentioned, are disposed in spaced relation to provide adequate insulation between them and the outer ends are so disposed to provide insulation as well as to faciliate securing terminals 12 and 13 to the respective foils. However the foils may be wound, they may be subjected to treatment in a bath of a suitable molten wax to expel the air. After the spaces are filled with wax, the condenser may be provided with a protective casing, as indicated at 14.

A condenser constructed by the method above disclosed ensures a material saving in the cost of production by avoiding the necessity of stacking a plurality of plates or layers of metal foil and a dielectric material. Furthermore, by constructing a condenser of continuous windings and by employing a film possessing a high dielectric strength, the ultimate condenser may be made very compact and thus ensure efficient service. Furthermore, the insulating film or dielectric, being very tough, supplements the strength of the foil and increases the durability of the finished condenser.

Although I have specifically described a method by which condensers may be constructed in accordance with my invention and specified materials which may be employed, it is obvious that various materials and methods of employing them may be utilized within the scope of my invention and I desire, therefore, that no limitations shall be imposed except such as are indicated in the appended claims.

I claim as my invention:

1. A condenser comprising windings of a plurality of metallic ribbons, one of which is of greater width than the other and a coating of hardened baking varnish disposed on the wider ribbon.

2. A condenser comprising a plurality of plates of insulating material and a plurality of metallic ribbons, one of which is coated with a hardened varnish, wound about the insulating plates with their inner ends maintained in spaced relation between the plates, the assembled structure being embedded in a suitable wax.

3. A method of making condensers that comprises coating metal foil with a baking varnish, drying the varnish and winding a plurality of strips of the coated foil about a plurality of plates of insulating material so that the coated foils engage throughout the major portion of their lengths but with corresponding ends of contiguous strips disposed in spaced relation.

4. A method of making condensers that comprises coating a strip of metal foil with varnish, drying the varnish and winding the coated strip of foil, together with an uncoated strip, about a plurality of plates of insulating material with the inner ends of the foils disposed in spaced relation between the plates.

In testimony whereof, I have hereunto subscribed my name this 31st day of Dec., 1918.

PAUL E. DEMMLER.